2 Sheets—Sheet 2.
J. E. BRIGGS.
Carriage-Brake.
No. { 863. / 31,867. }   Patented Apr. 2, 1861.
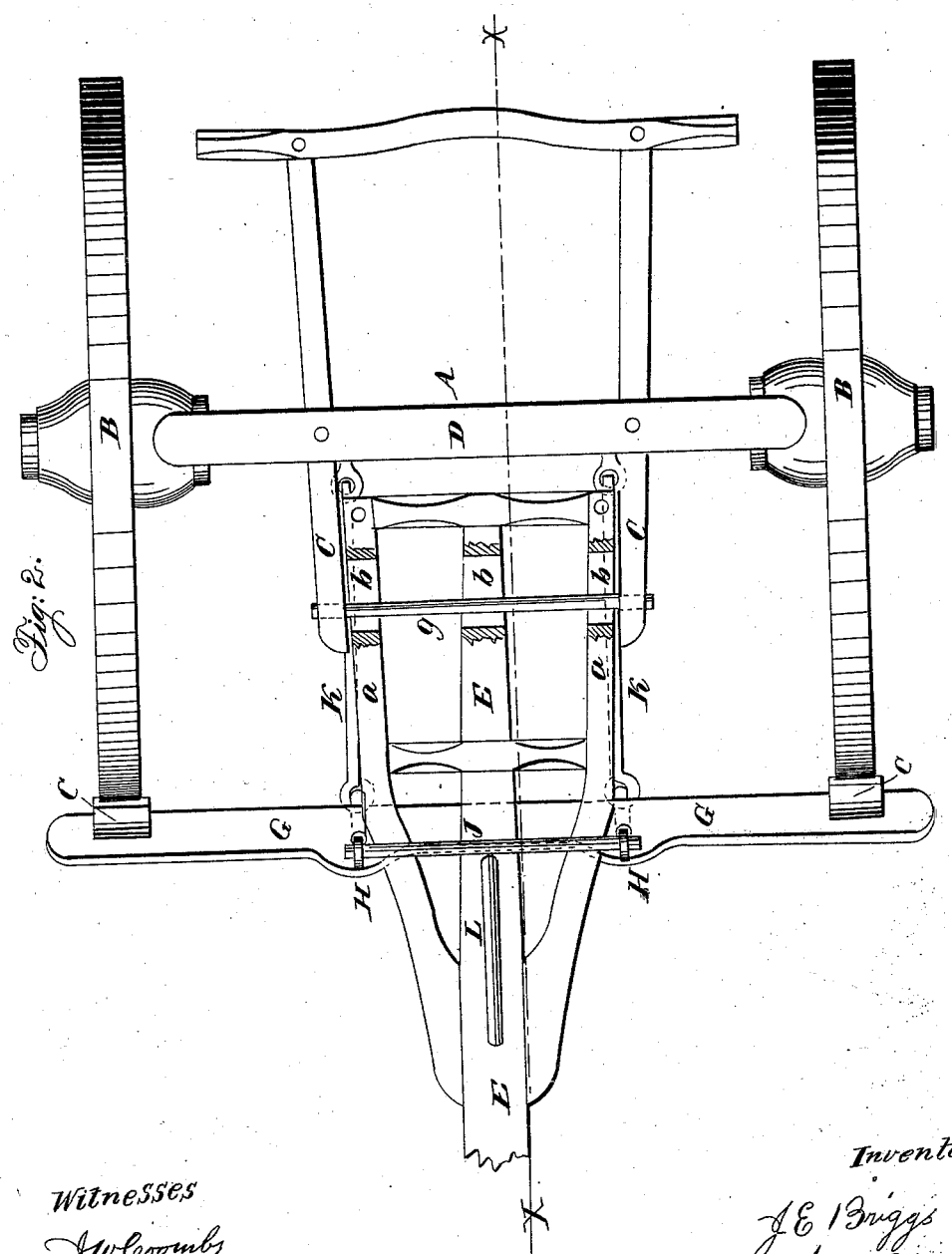
Witnesses
J W Coombs
R. S. Spencer
Inventor:
J E Briggs
per Munn & Co
Attorneys

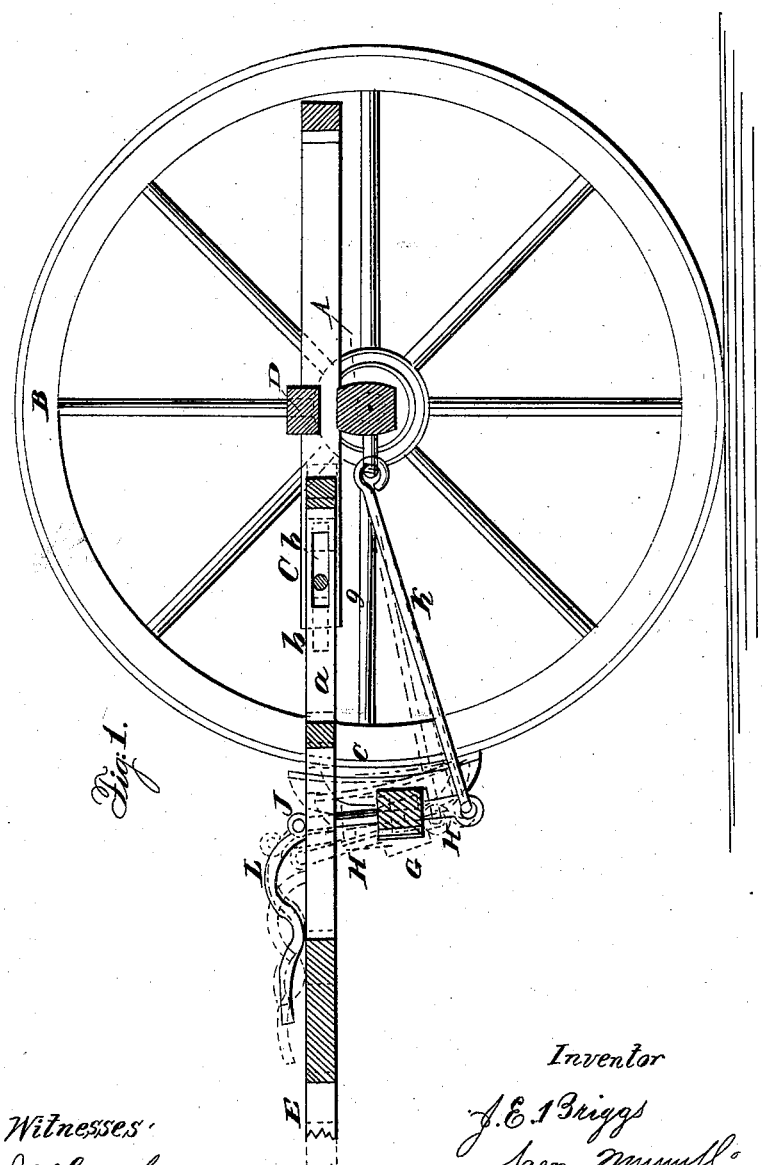

UNITED STATES PATENT OFFICE.

J. E. BRIGGS, OF WATERTOWN, NEW YORK.

BRAKE FOR CARRIAGES.

Specification of Letters Patent No. 31,867, dated April 2, 1861.

*To all whom it may concern:*

Be it known that I, J. E. BRIGGS, of Watertown, in the county of Jefferson and State of New York, have invented a new and Improved Brake for Vehicles; and I do hereby declare that the following is a full, clear, and exact description thereof, reference being had to the accompanying drawings, making a part of this specification, in which—

Figure 1, is a longitudinal section, taken in the vertical plane, indicated by the red line $x$, $x$, in Fig. 2. Fig. 2, is a plan view of the front running gear of a four wheel vehicle having my improved brake applied to it.

Similar letters of reference indicate corresponding parts in both figures.

The object of this invention and improvement in brakes for vehicles, is to obtain a self-acting brake which will be applied to the front wheels, and released therefrom when occasion requires it, by the ordinary stopping and starting movements of the horse in the vehicle.

The nature of my invention consists in combining with a draft pole or the thills of a vehicle, constructed so that they will have a longitudinal movement as will be hereinafter described, certain levers, and connecting rods which are operated upon by the aforesaid longitudinal movement of the draft pole, and which operate upon a transverse brake bar suitably arranged in front of the front wheels so as to apply the rubber blocks on the ends of this bar to the peripheries of the wheels, and to release these rubbers from the wheels, as will be hereinafter explained.

To enable those skilled in the art to make and use my invention I will proceed to describe its construction and operation.

The drawings represent merely the front running gear of a four wheel vehicle, those parts of the vehicle which are not shown are constructed in the usual manner.

A, represents the front axle-tree; and B, B, the wheels thereof; C, C, are the hounds, and D, is the bolster of a common four wheel vehicle.

E, is the draft pole which has two parallel pieces $a$, $a$, secured and braced on each side of its rear end so that this rear end of the draft pole is made much wider than usual. This rear end of pole E, is attached between the hounds C, C, by a transverse bolt $g$, which passes through the two hounds and through long slots $b$, $b$, $b$, which are made through the draft pole, as shown in Figs. 1. and 2, of the drawings. This draft pole E, is thus allowed to receive an endwise play between the hounds C, C, the amount of which play will be regulated by making the slots in the pole E, longer or shorter according to its requirements.

G, represents the brake bar which is hung from the pole E, and passes transversely across the bottom of this pole. Suitable blocks $c$, $c$, having curved surfaces are secured to the brake bar G, in proper positions on the bar to come in contact with the peripheries of the wheels B, B, when said bar is moved backward. Two levers H, H, are suitably attached to the brake bar G, and these levers project above and below the bar G, on each side of the wide part of the draft pole E. The upper ends of levers H, H, are connected by a transverse bar J, passing over the pole E, and the lower ends of levers H, H, are connected to the axle-tree A, by rods K, K.

L, is a curved rod which is secured on top of the pole E, at a suitable point in advance of the cross bar J. This rod projects up perpendicularly a short distance from the pole E, and is then bent forward so as to form an angle or short inclined plane with the perpendicular portion. Rod L, is shown clearly in Figs. 1, and 2, of the drawings, and it is against the perpendicular portion of this rod that the transverse bar J, of levers H, H, presses when the brakes are operating upon the wheels B, B. This rod L, forms a sort of purchase for the levers to allow the brake blocks $c$, $c$, to act with full force on the wheels, and to hold the upper ends of levers H, H, firmly in position when the front wheels roll forward against the brake blocks $c$, $c$, in descending a grade.

Now from the foregoing description it will be seen that when the vehicle runs forward by its own gravity, the wheels B, B, will be brought in contact with rubbers $c$, $c$, and then the forward rolling of these wheels B, B, the rubbers $c$, $c$, will be applied with augmented force according to the relative length of the arms of the levers H, H. When the brakes are thus applied the bar J, will be forced hard against bent rod L, and the upper ends of levers H, H, will be forced backward and held at their lower ends by the two rods K, K, connecting them with the axle-tree A.

When the wagon is pushed backward the motion of the wheels B, B, being reversed the rubber blocks c, c, with their brake bar G, will be raised and thereby loosened, so that the wheels B, B, will roll free. The rod L, receives the cross-bar J, on the inclined portion of this rod when the vehicle is backed, and when the wagon is drawn forward again by the horses, the bar J, will fall behind the perpendicular portion of rod L, in a position to apply the brakes when the vehicle descends a grade.

Having thus described my invention, what I claim as new, and desire to secure by Letters Patent, is:

The combination, with a draft pole E, which is allowed to have an endwise movement between the hounds C, C, of the brake bar G, levers H, H, rods K, K, transverse bar J, and the stop rod L, all arranged and operating substantially as and for the purposes herein set forth.

J. E. BRIGGS.

Witnesses:
 W. H. BEACH,
 S. D. BARR.